United States Patent
Wang et al.

(10) Patent No.: US 11,941,514 B2
(45) Date of Patent: Mar. 26, 2024

(54) METHOD FOR EXECUTION OF COMPUTATIONAL GRAPH IN NEURAL NETWORK MODEL AND APPARATUS THEREOF

(71) Applicant: ZHEJIANG LAB, Hangzhou (CN)

(72) Inventors: Hongsheng Wang, Hangzhou (CN); Hujun Bao, Hangzhou (CN); Guang Chen, Hangzhou (CN); Lingfang Zeng, Hangzhou (CN); Hongcai Cheng, Hangzhou (CN); Yong Li, Hangzhou (CN); Jian Zhu, Hangzhou (CN); Huanbo Zheng, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 136 days.

(21) Appl. No.: 17/706,734

(22) Filed: Mar. 29, 2022

(65) Prior Publication Data

US 2023/0274129 A1 Aug. 31, 2023

(30) Foreign Application Priority Data

Feb. 28, 2022 (CN) .......................... 202210183223.0

(51) Int. Cl.
*G06N 3/063* (2023.01)
*G06N 3/08* (2023.01)

(52) U.S. Cl.
CPC ............... *G06N 3/063* (2013.01); *G06N 3/08* (2013.01)

(58) Field of Classification Search
CPC .................................. G06N 3/063; G06N 3/08
See application file for complete search history.

(56) References Cited

U.S. PATENT DOCUMENTS

| 10,402,223 | B1 | 9/2019 | Santan et al. |
| 2021/0311994 | A1 | 10/2021 | Brevdo |
| 2022/0076123 | A1* | 3/2022 | Li ............................ G06N 3/04 |

FOREIGN PATENT DOCUMENTS

| CN | 109669772 A | 4/2019 |
| CN | 109815162 A | 5/2019 |
| CN | 110347636 A | 10/2019 |
| CN | 110378479 A | 10/2019 |
| CN | 111488221 A | 8/2020 |
| CN | 111562977 A | 8/2020 |
| CN | 112085166 A | 12/2020 |
| CN | 112465108 A | 3/2021 |

(Continued)

OTHER PUBLICATIONS

Gaunt et al., "AMPNet: Asynchronous Model-Parallel Training for Dynamic Neural Networks," in arXiv preprint arXiv:1705.09786 (2017). (Year: 2017).*

(Continued)

*Primary Examiner* — Ryan C Vaughn
(74) *Attorney, Agent, or Firm* — IPRO, PLLC

(57) ABSTRACT

The present disclosure discloses a method for execution of a computational graph in a neural network model and an apparatus thereof, including: creating task execution bodies on a native machine according to a physical computational graph compiled and generated by a deep learning framework, and designing a solution for allocating a plurality of idle memory blocks to each task execution body, so that the entire computational graph participates in deep learning training tasks of different batches of data in a pipelining and parallelizing manner.

13 Claims, 6 Drawing Sheets

(56) References Cited

FOREIGN PATENT DOCUMENTS

| CN | 112529169 A | 3/2021 | | |
|---|---|---|---|---|
| CN | 112766470 A | 5/2021 | | |
| CN | 112767230 A | 5/2021 | | |
| CN | 113918351 A | 1/2022 | | |
| CN | 114237918 A | 3/2022 | | |
| WO | WO-2019191578 A1 | * 10/2019 | ............. | G06F 15/78 |

OTHER PUBLICATIONS

Heghedus et al., "Neural Network Frameworks. Comparison on Public Transportation Prediction," in IEEE Int'l Parallel and Distributed Processing Symp. Workshops 842-49 (2019). (Year: 2019).*
Rahman, Md Khaledur, Majedul Haque Sujon, and Ariful Azad. "Fusedmm: A unified sddmm-spmm kernel for graph embedding and graph neural networks." 2021 IEEE International Parallel and Distributed Processing Symposium (IPDPS). IEEE, 2021.
Zhang, Han, Q. I. A. N. Yurong, and H. O. U. Haiyao. "Parallel optimization of edge detection algorithm for geological images under CUDA." Computer Engineering and Design 40.3 (2019): 691-698.

* cited by examiner

METHOD FOR EXECUTION OF COMPUTATIONAL GRAPH IN NEURAL NETWORK MODEL AND APPARATUS THEREOF

CROSS-REFERENCE TO RELATED APPLICATIONS

The present disclosure claims the benefit of priority to Chinese Application No. 202210183223.0 filed on Feb. 28, 2022 to China National Intellectual Property Administration and entitled "METHOD FOR EXECUTION OF COMPUTATIONAL GRAPH IN NEURAL NETWORK MODEL AND APPARATUS THEREOF", of which is incorporated herein by reference in this disclosure in its entirety.

TECHNICAL FIELD

The present disclosure relates to the technical field of deep learning, in particular to a method for execution of a computational graph in a neural network model and an apparatus thereof.

BACKGROUND

With the rapid development of industrial application of artificial intelligence technology, the demand for large models in practical application scenarios has become more and more urgent. Most of the existing deep learning frameworks provide efficient interfaces for expression of computation in neural network models and training of a neural network model on a single device. However, existing deep learning operating systems may not be flexible and effective when targeting new distributed devices for training of large-scale deep neural network model, because distributed devices require more complex parallelism than single devices. In addition, the developed distributed training interfaces enhance parallelism in models of existing deep learning frameworks, but complicate the use and implementation of distributed deep learning.

SUMMARY

The objective of the present disclosure is to provide a method for execution of a computational graph in a neural network model and an apparatus thereof, so as to overcome the deficiencies in the prior art.

In order to realize the above objective, the present disclosure provides the following technical solution.

The present disclosure discloses a method for execution of a computational graph in a neural network model, including: creating task execution bodies on a native machine according to a physical computational graph compiled and generated by a deep learning framework, and designing a solution for allocating a plurality of idle memory blocks to each task execution body, so that the entire computational graph participates in deep learning training tasks of different batches of data in a pipeline parallel manner. The specific steps are as follows:

S1: creating the task execution bodies to regard operator kernel functions for operating different operators as different computational tasks, in particular, constructing task execution bodies respectively corresponding to respective kernel functions to execute the operator kernel functions, wherein the task execution bodies include a current execution body, a downstream execution body in communication with the current execution body, and an upstream execution body in communication with the current execution body;

S2: producing, by the current execution body, tensor data of the current execution body;

S3: packing, by the current execution body, the tensor data produced by the current execution body into a message;

S4: sending, by the current execution body, the message to the downstream execution body;

S5: sending, by the current execution body, the message to the upstream execution body;

S6: preparing, by the downstream execution body, tensor data, wherein the downstream execution body prepares the tensor data according to the received message sent from the current execution body;

S7: preparing, by the downstream execution body, an available tensor memory block for storing the tensor data produced by the downstream execution body;

S8: performing, by the downstream execution body, a task of an internal operator kernel function of the downstream execution body, and producing output tensor data;

S9: constructing a data parallelizing mode between the task execution bodies, including the following specific sub-steps:

S91: allocating an idle memory block to each task execution body;

S92: initiating execution of an task execution body; and

S93: operating the entire computational graph in parallel.

Preferably, the specific sub-steps of the step S1 are as follows:

S11: creating a task queue of the operator kernel functions, wherein the computational tasks of a current operator kernel function are added into a task queue of the current operator kernel function in sequence; computational graphs are added into the task queue of the current operator kernel function in sequence through the computational tasks of the current operator kernel function according to a topological order until the entire computational graph is added into the task queue;

S12: creating threads of the task execution bodies, wherein the threads of the task execution bodies acquire current to-be-processed tasks in sequence from the task queue;

S13: creating the task execution bodies of operator kernel functions, wherein task execution bodies for calculating operator kernel functions are created according to the current to-be-processed tasks and context information of the current thread, and the computational tasks corresponding to the operator kernel functions in the task queue are performed using the task execution bodies;

S14: creating an event recall queue, wherein an event recall queue is created when all the task execution bodies in the task queue are processed, and the computational tasks that are processed by the task execution bodies are added into the event recall queue in sequence; and S15: creating a thread of the event recall queue, wherein the thread of the event recall queue is used for taking out and returning the tasks that have been processed in the event recall queue.

Preferably, the specific process of the step S2 is as follows: the current execution body loads the computational task of its internal operator kernel function, executes kernel function calculation, and produces output tensor data of the computational task of the kernel function.

Preferably, the specific process of the step S3 is as follows: the tensor data produced by the current execution body are stored into an available memory block; an address of the memory block and an identification number of the downstream execution body corresponding to the current execution body are packed into a message; the current execution body prepares to send the message to the downstream execution body corresponding to the current execution body.

Preferably, the specific process of the step S4 is as follows: when the current execution body completes the computational task of its own kernel function and the message sent to the downstream execution body is prepared, the current execution body starts to send the message to the downstream execution body that needs to consume the tensor data produced by the current execution body and informs the corresponding downstream execution body of reading the data produced by the current execution body.

Preferably, the specific process of the step S5 is as follows: the current execution body also needs to return the memory block for the consumed tensor data from the upstream execution body to the upstream execution body, indicating that the current execution body has used the data of the upstream execution body and that the upstream execution body may reuse the memory block for the output tensor data of the upstream execution body.

Preferably, the specific process of the step S6 is as follows: the downstream execution body parses the message to obtain the tensor data produced by the above current execution body, with the tensor data used as an input tensor in the execution of its operator kernel function by the downstream execution body.

Preferably, the specific process of the step S7 is as follows: the downstream execution body requests a memory block for output tensor data produced when executing the computational task of the corresponding operator kernel function.

Preferably, the specific sub-steps of the step S8 are as follows:
S81: the downstream execution body determines whether the following execution conditions are satisfied currently after receiving the message of the above current execution body: a) tensor data required to be read by the downstream execution body are ready; b) there is an idle memory block available for storing the output tensor data produced when the downstream execution body executes the corresponding operator kernel function; and
S82: after the execution conditions are satisfied, the downstream execution body starts to call an internal operator kernel function of the downstream execution body, reads the tensor data sent from the aforesaid current execution body, executes the computational task of its internal operator kernel function, and writes a produced output tensor into the aforesaid available tensor memory block.

Preferably, the specific sub-steps of the step S91 are as follows:
S911: a physical computational graph composed of a plurality of operators having production and consumption relationships is constructed. The operators are labeled as operator a, operator b, operator c, ..., and operator i, thus creating respective execution bodies for executing their own kernel functions respectively according to the operators, and constituting an execution computational graph composed of corresponding execution body A, execution body B, execution body C, ..., and execution body I, which have production and consumption relationships. An idle memory block for tensors produced and consumed by each execution body is allocated to each execution body.
S912: different batches of input data are fed and a memory is allocated for tensor data produced when execution body A executes a kernel function of operator a, wherein the idle memory block corresponding to a zeroth batch of data is memory block a0, the idle memory block corresponding to a first batch of data is memory block a1, the idle memory block corresponding to a second batch of data is memory block a2, ..., and the idle memory block corresponding to an ith batch of data is memory block ai.

A memory is allocated for tensor data produced when execution body B executes a kernel function of operator b, wherein the idle memory block corresponding to the zeroth batch of data is memory block b0, the idle memory block corresponding to the first batch of data is memory block b1, the idle memory block corresponding to the second batch of data is memory block b2, ..., and the idle memory block corresponding to the ith batch of data is memory block bi.

A memory is allocated for tensor data produced when execution body C executes a kernel function of operator c, wherein the idle memory block corresponding to data of the zeroth batch is memory block c0, the idle memory block corresponding to the first batch of data is memory block c1, the idle memory block corresponding to the second batch of data is memory block c2, ..., and the idle memory block corresponding to the ith batch of data is memory block ci.

Procedures of steps S911 and S912 are repeated until a memory block is allocated for tensor data produced when execution body I executes a kernel function of operator i.

Preferably, a specific process of step S92 is as follows: at time T0, the zeroth batch of data is input, and execution body A executes the kernel function of operator a and writes the output tensor data as an execution result into idle memory block a0; downstream execution body B, downstream execution body C, ..., and downstream execution body I are in a waiting state since there are no readable input tensor data.

Preferably, the specific process of the step S93 is as follows:

At time T1, execution body A informs execution body B of reading memory block a0 produced by execution body A; execution body B receives a message of reading memory block a0 produced by execution body A, and checks whether there is an idle memory block available in memory region b produced by execution body B; if idle memory block b0 is available, execution body B executes the computational task of the kernel function of operator b, reads memory block a0, and writes the output tensor result produced by the execution into memory block b0. At time T1, execution body A also checks whether execution body A has a writable idle memory block; if execution body A has the writable idle memory block, execution body A also input the first batch of data at time T1, and writes an execution result into idle memory block a1, so that execution body A and execution body B start to operate in parallel, and downstream execution body C, ..., and downstream execution body I still wait since there are no readable data.

At time T2, execution body B, after producing memory block b0, sends a message to a downstream consumer, i.e. execution body C, to inform execution body C of reading memory block b0 produced by execution body B. At time T2, a message is sent to an upstream producer, i.e. execution body A, to inform execution body A of a fact that execution body B has used memory block a0 of execution body A. At time T2, execution body A sends memory block a1 produced for training the first batch of input data to execution body B for a second time. Execution body B checks to find that it has idle memory block b1, and thus starts to read memory block a1 and write into idle memory block b1. Execution body C receives memory block b0. When finding idle memory block c0 is available therein, execution body C starts execution of the kernel function of operator c, reads memory block b0 and writes into memory block c0. Execution body A receives a message of memory block a0 having been used and returned by execution body B and checks to find that all of consumers of execution body A have used memory block a0, and then recovers memory block a0 and labels it as an idle block. At time T2, execution body A may also continue execution and write into memory block a2.

At time T2, execution bodies A, B, and C all operate. For a deep learning training task, at time T2, memory block b0 and memory block c0 store the zeroth batch of data for training; memory block a1 and memory block b1 store the first batch of data for training; memory block a2 stores the second batch of data for training. A plurality of execution bodies are operated in a pipeline parallel manner by aforesaid step S93.

The present disclosure further discloses an apparatus for execution of a computational graph for a neural network model, including:
- a task execution body construction module, used for creating a task queue of operator kernel functions, threads of task execution bodies, task execution bodies of kernel functions, an event recall queue, and a thread of the event recall queue;
- a task execution body internal module, used for: by a current execution body, producing tensor data of the current execution body, packing the tensor data into a message, and sending the message to an upstream execution body and a downstream execution body;
by the downstream execution body, preparing tensor data, preparing an available tensor memory block required for storing data produced by the downstream execution body, and executing a task of an internal operator kernel function of the downstream execution body and producing output tensor data; and
- a task execution body pipelining and parallelizing module, used for allocating idle memory blocks to respective task execution bodies, initiating execution of tasks, making execution bodies perform the entire computational graph in parallel.

Preferably, a specific process executed by the task execution body construction module is as follows:
step 1: creating a task queue of the operator kernel functions: adding computational tasks of a current operator kernel function into a task queue of the current operator kernel function in sequence; adding the computational tasks of the current operator kernel function into the task queue of the current operator kernel function in sequence according to a topological order until the entire computational graph is added into the task queue;
step 2: creating threads of the task execution bodies, wherein the threads of the task execution bodies acquire current to-be-processed tasks in sequence from the task queue;
step 3: creating the task execution bodies of the operator kernel functions, wherein the task execution bodies used for calculating operator kernel functions are created according to the current to-be-processed tasks and context information of a current thread, and task execution bodies are used to perform computational tasks corresponding to the operator kernel functions in the task queue;
step 4: creating an event recall queue, wherein the event recall queue is created when all the task execution bodies in the task queue are processed, and the computational tasks that are processed by the task execution bodies are added into the event recall queue in sequence; and
step 5: creating a thread of the event recall queue, wherein the thread of the event recall queue is used for taking out and returning the tasks that have been processed in the event recall queue.

Preferably, a specific process executed by the task execution body internal module is as follows:
Step 1: the current execution body produces tensor data of the current execution body, wherein the current execution body loads a computational task of an operator kernel function in the current execution body, executes computation of the kernel function, and produces output tensor data of the computational task of the kernel function.
Step 2: the current execution body packs the tensor data produced by the current execution body into a message, wherein the tensor data produced by the current execution body are stored into an available memory block. An address of the available memory block and an identification number of the downstream execution body corresponding to the current execution body are packed into a message. The current execution body prepares to send the message to the downstream execution body corresponding to the current execution body.
Step 3: the current execution body sends the message to the downstream execution body. When the current execution body completes the calculation task of a kernel function of the current execution body, and the message sent to the downstream execution body is prepared, the current execution body starts to send the message to the downstream execution body that needs to consume the tensor data produced by the current execution body and informs the corresponding downstream execution body of reading the data produced by the current execution body.
Step 4: the current execution body sends the message to the upstream execution body. The current execution body also needs to return the consumed memory block of the tensor data of the upstream execution body to the upstream execution body, indicating that the current execution body has used the data of the upstream execution body. The upstream execution body is permitted to recover the memory block of the output tensor data of the upstream execution body;
Step 5: the downstream execution body prepares tensor data. The downstream execution body prepares the tensor data according to the received message sent by the current execution body. The downstream execution body parses the message to obtain the tensor data produced by the above current execution body, and the tensor data are used as an input tensor when the downstream execution body operates an operator kernel function thereof.
Step 6: the downstream execution body prepares an available tensor memory block required for storing the tensor data produced by the downstream execution body. The downstream execution body requests a memory block for output tensor data produced when executing the computational task of the corresponding operator kernel function; and Step 7: the downstream execution body executes the task of an internal operator kernel function of the downstream execution body and produces output tensor data. After receiving the message of the above current execution body, the downstream execution body determines whether execution conditions are satisfied currently: a) tensor data required to be read by the downstream execution body are ready; b) there is an idle memory block available for storing the output tensor data produced when the downstream execution body executes the operator kernel function. After the execution conditions are satisfied, the downstream execution body starts to call an internal operator kernel function of the downstream execution body, reads the tensor data sent by the above current execution body, executes the computational task of its internal operator kernel function, and writes the produced output tensor data into the available memory block of the output tensor.

Preferably, a specific process executed by the task execution body pipelining and parallelizing module is as follows:

Step 1: a physical computational graph composed of a plurality of operators having production and consumption relationships is constructed, the operators are labeled as operator a, operator b, operator c, . . . , and operator i; execution bodies for executing their own kernel functions are created according to respective operators to constitute an execution computational graph composed of execution body A, execution body B, execution body C, . . . , and execution body I having production and consumption relationships; and an idle memory block for tensors produced and consumed by each execution body is allocated to the corresponding execution body.

Different batches of input data are fed. A memory is allocated for tensor data produced when execution body A executes a kernel function of operator a, wherein the idle memory block corresponding to a zeroth batch of data is memory block a0, the idle memory block corresponding to a first batch of data is memory block a1, the idle memory block corresponding to a second batch of data is memory block a2, . . . , and the idle memory block corresponding to an ith batch of data is memory ai.

A memory is allocated for tensor data produced when execution body B executes a kernel function of operator b, wherein the idle memory block corresponding to the zeroth batch of data is memory block b0, the idle memory block corresponding to the first batch of data is memory block b1, the idle memory block corresponding to the second batch of data is memory block b2, . . . , and the idle memory block corresponding to the ith batch of data is memory block bi.

A memory is allocated for tensor data produced when execution body C executes a kernel function of operator c, wherein the idle memory block corresponding to the zeroth batch of data is memory block c0, the idle memory block corresponding to the first batch of data is memory block c1, the idle memory block corresponding to the second batch of data is memory block c2, . . . , and the idle memory block corresponding to the ith batch of data is memory block ci.

The memory allocation process is repeated until a memory block is allocated for tensor data produced when execution body I executes a kernel function of operator i.

Step 2: execution of an execution body is initiated. At time T0, the zeroth batch of data is input, execution body A executes the kernel function of operator a and writes the output tensor data as an execution result into idle memory block a0, and downstream execution body B, execution body C, . . . , and execution body I are in a waiting state since there are no readable input tensor data.

Step 3: the entire computational graph is performed in parallel. At time T1, execution body A informs execution body B of reading memory block a0 produced by execution body A; execution body B receives a message of reading memory block a0 produced by execution body A, and checks whether there is an idle memory block available in memory region b produced by execution body B; if it finds that there is idle memory block b0 available, execution body B executes the computational task of the kernel function of operator b and reads memory block a0. Execution body B writes an output tensor result generated by execution into memory block b0. At time T1, execution body A may also check whether execution body A has a writable idle memory block; if execution body A has the writable idle memory block, at time T1, execution body A also executes the first batch of input data and writes an execution result into idle memory block a1, so that execution body A and execution body B start to operate in parallel. Downstream execution body C, . . . , and execution body I are still in waiting state since there are no readable data.

At time T2, execution body B sends a message to a downstream consumer, i.e. execution body C, to inform execution body C of reading memory block b0 after execution body B produces memory block b0. At time T2, execution body B sends a message to an upstream producer, i.e. execution body A, to inform execution body A of execution body B's having used memory block a0 of execution body A. At time T2, execution body A sends memory block a1 produced for training the first batch of input data to execution body B for a second time. Execution body B checks to find that it still has idle memory block b1, thereafter starts to read memory block a1 and write into idle memory block b1. Execution body C receives memory block b0 and finds that it has an idle memory block c0 available, then starts to read memory block b0 and write into memory block c0. Execution body A receives a message of memory block a0 having been used and returned by execution body B and checks to find that all of consumers of execution body A have used memory block a0, then execution body A recovers memory block a0 and labels memory block a0 as an idle block. Execution body A may also continue to execute and write into memory block a2.

At time T2, execution bodies A, B, and C all operate. For a deep learning training task, at time T2, memory block b0 and memory block c0 store the zeroth batch of data for training, memory block a1 and memory block b1 store the first batch of data for training, and memory block a2 stores the second batch of data for training. A plurality of execution bodies are operating in a pipelining and parallelizing manner by step 3.

The present disclosure further discloses an apparatus for execution of a computational graph in a neural network model. The apparatus includes a memory and one or more processors. The memory stores executable codes. The one or more processors implement the method for execution of the computational graph in the neural network model when executing the executable codes.

The present disclosure achieves the following beneficial technical effects:

According to the method for execution of the computational graph in the neural network model and the apparatus thereof disclosed in present disclosure, execution bodies of operator kernel functions are taken as basic blocks, tensors thus produced and consumed are taken as data flow in the entire computational graph, and thus the execution bodies realize a model training process in a pipelining and parallelizing manner. In a scenario of application of large-scale distributed deep neural network, the present disclosure lowers the threshold for user application, and enables the model to learn the intrinsic correlation of a large number of data flowing into the neural network in batches, thereby to obtain the capability of "intelligent" perception and judgment in the corresponding scenario. The present disclosure provides a concise and easy-to-use neural network model operating apparatus for algorithm engineers related to deep learning so that they can train the deep learning model conveniently.

DETAILED DESCRIPTION

In order to make the objectives, technical solutions and advantages of the present disclosure clearer, the present disclosure is further described below in detail with reference to accompanying drawings and embodiments. It should be understood that the specific embodiments described here are merely to explain the present disclosure, and not intended to limit the scope of the present disclosure. In addition, in the following descriptions, the descriptions of knowable structures and techniques are omitted to avoid unnecessary confusion of the concept of the present disclosure.

Figure 1:
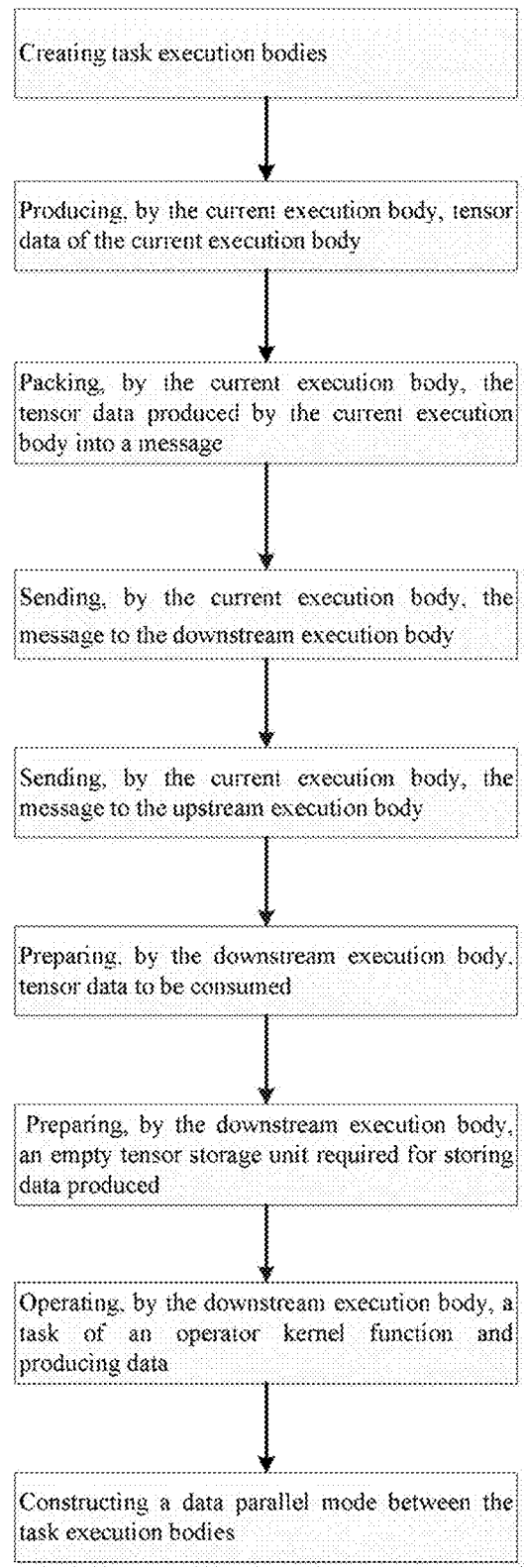
FIG. 1 is a flow chart of a method for execution of a computational graph in a neural network model according to an embodiment of the present disclosure.

As shown in FIG. 1, an embodiment of the present disclosure provides a method for execution of a computational graph in a neural network model, including: creating task execution bodies on a native machine according to a physical computational graph compiled and generated by a deep learning framework, and designing a solution for allocating a plurality of idle memory blocks to each task execution body, so that the entire computational graph participates in deep learning training tasks of different batches of data in a pipelining and parallelizing manner. Specific steps are as follows:

step I: creating the task execution bodies to regard operator kernel functions for operating different operators as different computational tasks, in particular, constructing the task execution bodies respectively corresponding to respective kernel functions to operate the operator kernel functions, wherein the task execution bodies include a current execution body, a downstream execution body in communication with the current execution body, and an upstream execution body in communication with the current execution body;

step II: producing, by the current execution body, tensor data of the current execution body;

step III: packing, by the current execution body, the tensor data produced by the current execution body into a message;

step IV: sending, by the current execution body, the message to the downstream execution body;

step V: sending, by the current execution body, the message to the upstream execution body;

step VI: preparing, by the downstream execution body, tensor data, wherein the downstream execution body prepares the tensor data according to the received message sent from the current execution body;

step VII: preparing, by the downstream execution body, an available tensor memory block required for storing the tensor data produced by the downstream execution body;

step VIII: performing, by the downstream execution body, a task of an internal operator kernel function of the downstream execution body, and producing output tensor data; and step IX: constructing a data parallelizing mode between the task execution bodies.

The upstream execution body and the downstream execution body refer to execution bodies having a production and consumption relationship with the current execution body, wherein the current execution body consumes the tensor data produced by the upstream execution body, and the tensor data produced by the current execution body flows to the downstream execution body.

Figure 2:
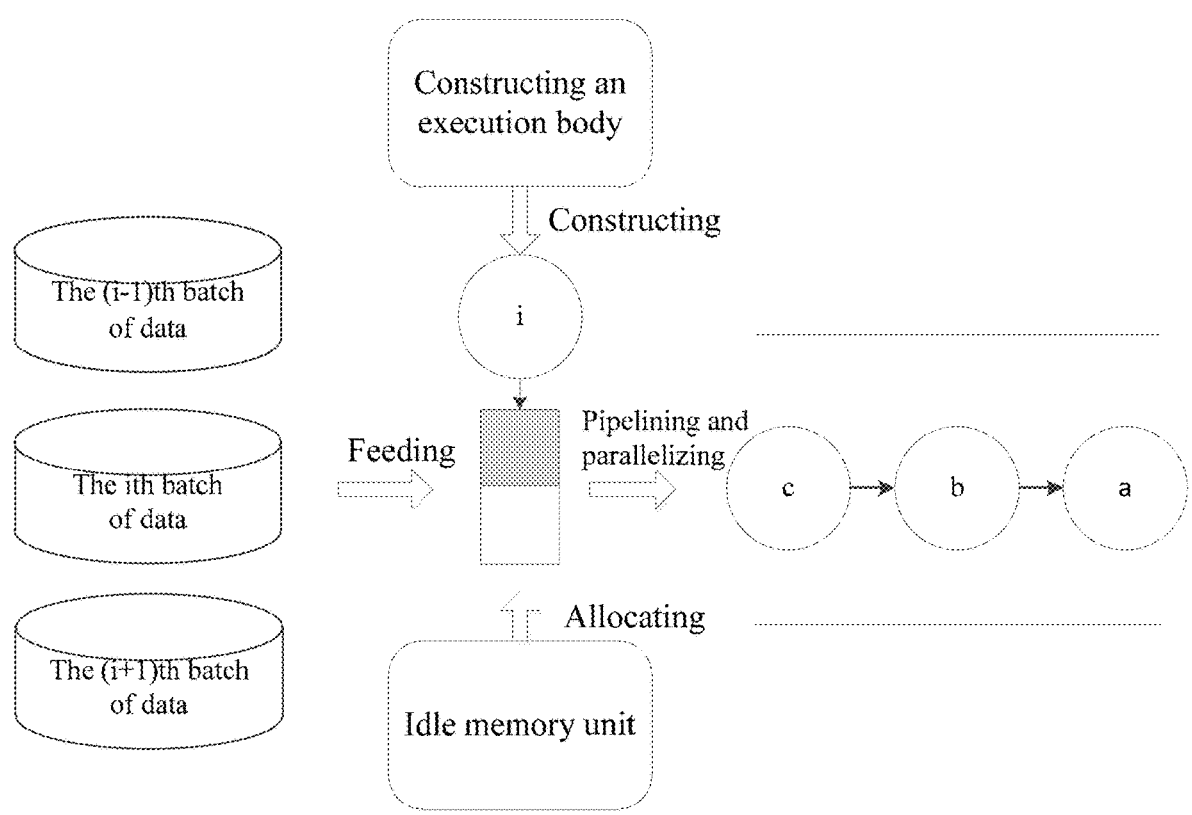
FIG. 2 is an architecture diagram of a method for execution of a computational graph in a neural network model according to an embodiment of the present disclosure.

As shown in FIG. 2, an architecture diagram of a method for execution of a computational graph in a neural network model is illustrated. Data for training are fed into the neural network model in batches; graph execution bodies on the native machine are created according to the physical computational graph compiled and generated by the deep learning framework, and a plurality of idle memory blocks are allocated to each task execution body, so that the entire computational graph simultaneously participates in a deep learning training task in a pipelining and parallelizing manner.

Step I: task execution bodies are created, including the following specific steps:

step 1: creating a task queue of the operator kernel functions, wherein computational tasks of a current operator kernel function are added into a task queue of the current operator kernel function in sequence; computational graphs are added into the task queue of the current operator kernel function in sequence through the computational tasks of the current operator kernel function according to a topological order until the entire computational graph is added into the task queue.

step 2: creating threads of the task execution bodies, wherein the threads of the task execution bodies acquires current to-be-processed tasks in sequence from the task queue.

step 3: creating the task execution bodies of the operator kernel functions, wherein the task execution bodies used for computation of operator kernel functions are created according to the current to-be-processed tasks and context information of a current thread, and computational tasks corresponding to the operator kernel functions in the task queue are performed by using the task execution bodies.

step 4: creating an event recall queue, wherein the event recall queue is created when all the task execution bodies in the task queue are processed, and the computational tasks that are processed by the task execution bodies are added into the event recall queue in sequence; and step 5: creating a thread of the event recall queue, wherein the thread of the event recall queue is used for taking out and returning the tasks that have been processed in the event recall queue.

Figure 3:
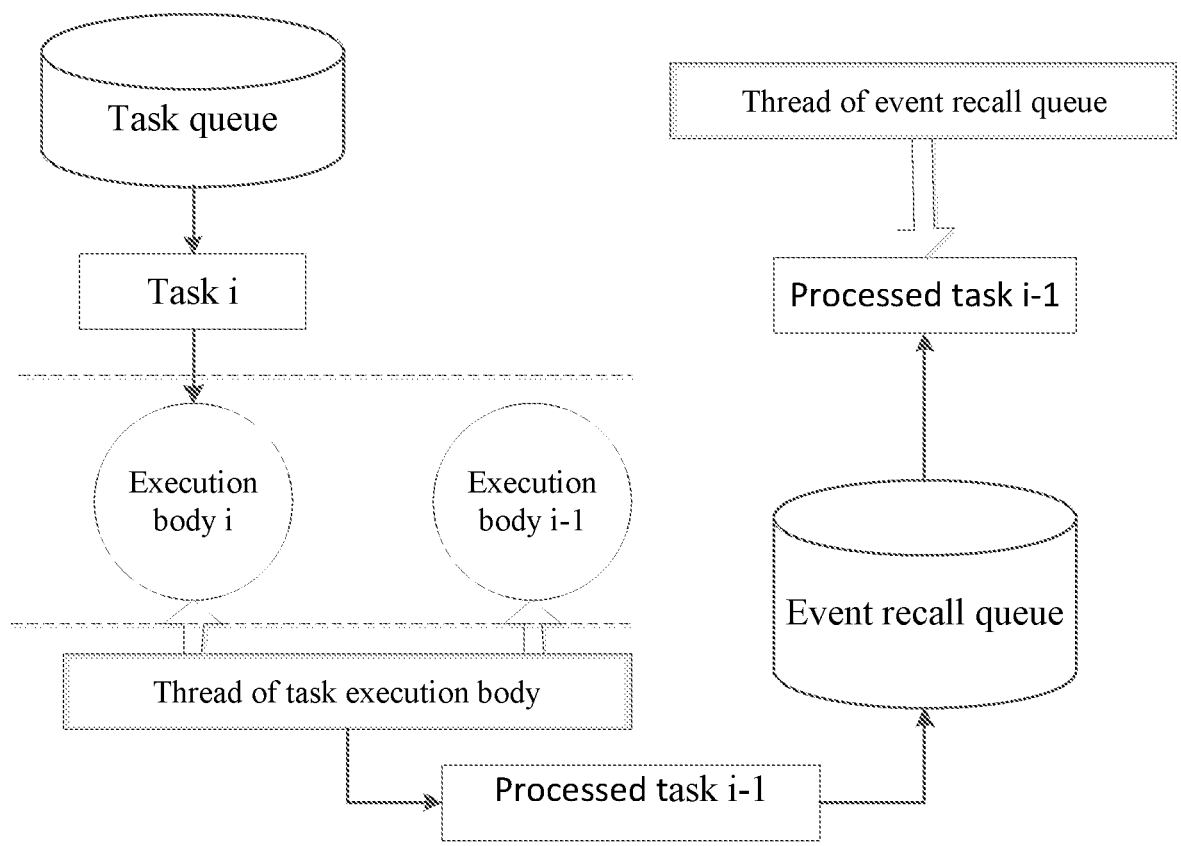
FIG. 3 is a flow chart of creating and managing thread modules of a task execution body according to an embodiment of the present disclosure.

As shown in FIG. 3, a flow chart of creating and managing a task execution body thread module is illustrated. The thread of the task execution body acquires a current to-be-processed task i from the task queue; a task execution body used for a computational task of a current operator kernel function is created according to the current to-be-processed task i; and the task execution body is used for operating task i. When task i−1 is processed, task i−1 is added into the event recall queue, and the thread of the event recall queue takes out and returns task i−1 that is processed from the queue.

Step II: the current execution body produces tensor data of the current execution body.

The current execution body loads a computational task of an operator kernel function in the current execution body, executes kernel function computation, and produces output tensor data of the computational task of the kernel function.

Step III: the current execution body packs the tensor data produced by the current execution body into a message.

The tensor data produced by the current execution body is stored into an available memory block, and an address of the available memory block and an identification number of the downstream execution body corresponding to the current execution body are packed into a message. The current execution body prepares to send the message to its target execution body. The target execution body is the downstream execution body corresponding to the current execution body. The message uses data format of Protocol Buffers (ProtoBuf). The message includes an address field of the memory block and an identification number field of the downstream execution body corresponding to the current execution body.

Step IV: the current execution body sends the message to the downstream execution body.

When the current execution body completes the computational task of the own kernel function, and the message sent to the downstream execution body is prepared, the current execution body sends the message to those downstream execution bodies that need to consume the tensor data produced by the current execution body, indicating that the downstream execution body is allowed to read the data produced by the current execution body.

Step V: the current execution body sends the message to the upstream execution body.

The current execution body also needs to return the consumed memory block of the tensor data from the upstream execution body to those upstream execution bodies as the producers, indicating that the current execution body has used the data of the upstream execution body, and that the upstream execution body is permitted to recover the memory block of the output tensor data of the upstream execution body.

Step VI: the downstream execution body prepares tensor data.

The downstream execution body prepares the tensor data according to the received message sent by the current execution body. The downstream execution body parses the message to obtain the tensor data produced by the aforesaid current execution body, wherein the tensor data are used as an input tensor when the downstream execution body operates an operator kernel function of the downstream execution body.

Step VII: the downstream execution body prepares an available tensor memory block required for storing the tensor data produced by the downstream execution body.

The downstream execution body requests a memory block of output tensor data produced when the downstream execution body executes the computational task of the operator kernel function.

Step VIII: the downstream execution body operates the tasks of an internal operator kernel function of the downstream execution body, and produces output tensor data.

Figure 4:
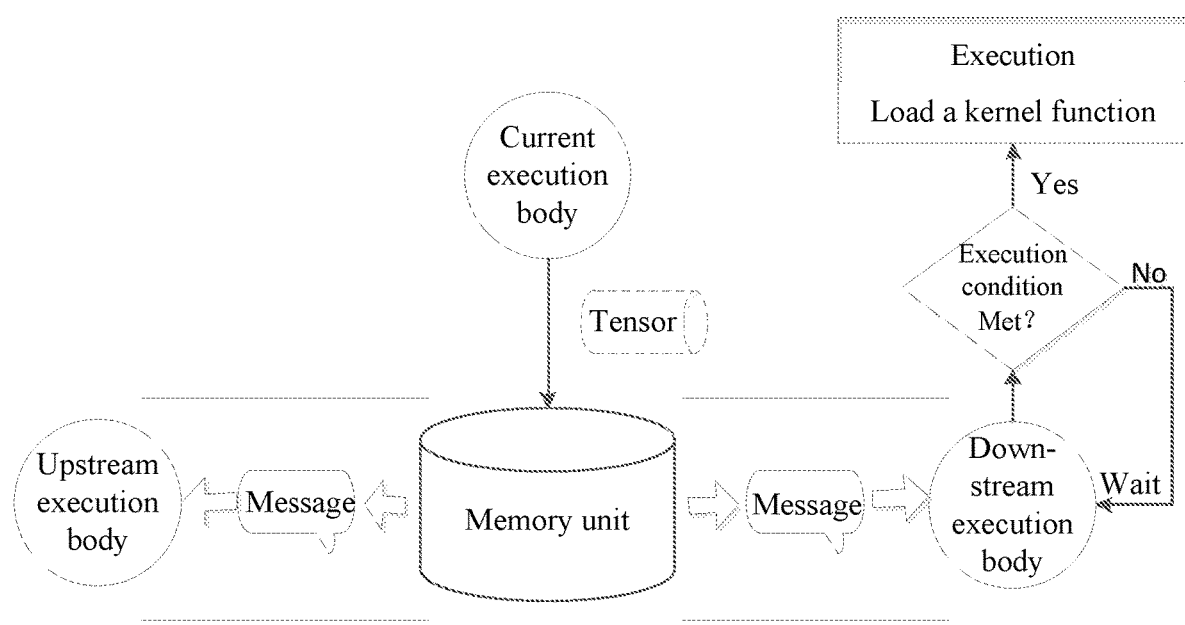
FIG. 4 is a process for constructing an internal operating mode of a task execution body according to an embodiment of the present disclosure.

The downstream execution body determines whether the following execution conditions are currently satisfied after receiving the message of the above current execution body: a) tensor data needing to be read by the downstream execution body are ready; b) there is an idle memory block available used for storing the output tensor data produced when the downstream execution body operates the corresponding operator kernel function. When the execution conditions are satisfied, the downstream execution body starts to call an internal operator kernel function of the downstream execution body, reads the tensor data sent by the aforesaid current execution body, executes the computational task of the internal operator kernel function of the downstream execution body, and writes the produced output tensor into the aforesaid requested memory block of tensor. FIG. 4 shows a process for constructing an internal working mode of a task execution body.

Step IX: A data parallelizing mode between the task execution bodies is constructed.

Constructing the data parallelizing mode between the task execution bodies is conducted as follows:

Step 1: an idle memory block is allocated to each task execution body. In particular, a physical computational graph composed of operator a→operator b→operator c→ . . . →operator i is constructed. Execution bodies for operating their own kernel functions are created respectively according to the respective operators to constitute an execution computational graph of execution body A→execution body B→execution body C→ . . . →execution body I, wherein the arrow denotes that a downstream operator or execution body consumes the tensor data produced by an upstream operator or execution body. An idle memory block for tensors produced and consumed by each execution body is allocated to each execution body and then different batches of input data are fed. A memory is allocated for tensor data produced when execution body A executes the kernel function of operator a. In particular, the idle memory block corresponding to a zeroth batch of data is memory block a0, the idle memory block corresponding to a first batch of data is memory block a1, the idle memory block corresponding to a second batch of data is memory block a2, . . . , and the idle memory block corresponding to an ith batch of data is memory block ai. A memory is allocated for tensor data produced when execution body B executes the kernel function of operator b. In particular, the idle memory block corresponding to the zeroth batch of data is memory block b0, the idle memory block corresponding to the first batch of data is memory block b1, . . . , and the idle memory block corresponding to the ith batch of data is memory block bi. A memory is allocated for tensor data produced when execution body C executes the kernel function of operator c. In particular, the idle memory block corresponding to the zeroth batch of data is memory block c0, the idle memory block corresponding to the first batch of data is memory block c1, . . . , and the idle memory block corresponding to the ith batch of data is memory block ci. The allocation of memory continues until a memory block is allocated for tensor data produced when execution body I executes a kernel function of operator i.

Step 2: execution of a task execution body is initiated.

In particular, at time T0, the zeroth batch of data is input; execution body A executes the kernel function of operator a and writes an output tensor of an operation result into idle memory block a0; and downstream execution body B, execution body C, . . . , and execution body I are all in a waiting state since there are no readable input tensor data.

Step 3: the entire computational graph is operated in parallel.

In particular, execution body A informs execution body B of reading memory block a0 produced by execution body A. Execution body B receives a message of reading memory block a0 produced by execution body A, and checks whether there is an idle memory block available from among memory block b produced by execution body B. If idle memory block b0 is found available, execution body B executes a computational task of the kernel function of operator b, reads memory block a0, and writes an output tensor result produced by execution into memory block b0. At time T1, execution body A may also check whether execution body A has a writable idle memory block. If execution body A has the writable idle memory block, at time T1, execution body A also executes the first batch of input data and writes the execution result into idle memory block a1, so that execution body A and execution body B start to operate in parallel. Downstream execution body C, . . . , and execution body I still wait since there are no readable data.

At time T2, after producing memory block b0, execution body B sends a message to downstream consumer, i.e. execution body C, to inform it to read memory block b0 produced. At the same time, execution body B sends a message to the upstream producer, i.e. execution body A, to inform it that execution body B sends memory block a0 of execution body A. At time T2, execution body A has sent memory block a1 produced by training the first batch of input data to execution body B for a second time. Execution body B checks to find that it still has idle memory block b1, starts to read memory block a1, and writes into idle memory block b1. Execution body C receives a message of reading memory block b0 and finds that it has an idle memory block c0, starts to read memory block b0 and then writes into memory block c0. Execution body A receives the message that execution body B has used and returned memory block a0, checks that all consumers have used memory block a0, and then recovers memory block a0 and labels it as an idle memory block. At time T2, execution body A may also continue execution and write into memory block a2.

Figure 5:
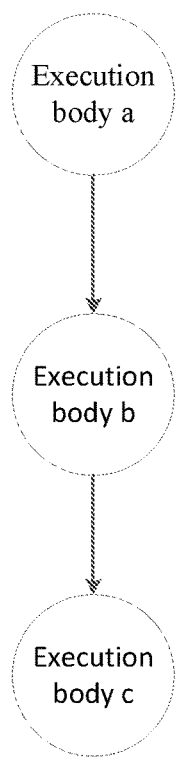
FIG. 5 is a process of pipelining and parallelizing execution of execution bodies according to an embodiment of the present disclosure.

At time T2, execution bodies A, B, and C all operate. In a deep learning training task, at time T2, memory block b0 and memory block c0 store the zeroth batch of data for training, memory block a1 and memory block b1 store the first batch of data for training, and memory block a2 stores the second batch of data for training. By means of the design of a plurality of idle memory blocks, the execution bodies realize pipelining and parallelizing operation. FIG. 5 illustrates a process of pipelining and parallelizing execution of execution bodies.

The present disclosure further provides an apparatus for execution of a computational graph in a neural network model, which is used as an operation engine of a deep learning framework. The technical solution of the present disclosure will be further described below in detail as an example by an implementation of an apparatus for execution of a computational graph in a neural network model.

The implementation of the apparatus for execution of the computational graph in the neural network model includes the following modules:

Module I: a task execution body construction module, configured to complete the following processes:

step 1: creating a task queue of the operator kernel functions, wherein the computational tasks of a current operator kernel function are added into a task queue of the current operator kernel function in sequence, computational graphs are added into the task queue of the current operator kernel function in sequence through the computational tasks of the current operator kernel function according to a topological order until the entire computational graph is added into the task queue;

step 2: creating threads of the task execution bodies, wherein the threads of the task execution bodies are used for acquiring current to-be-processed tasks in sequence from the task queue;

step 3: creating the task execution bodies of the operator kernel functions, wherein the task execution bodies used for calculating operator kernel functions are created according to the current to-be-processed tasks and context information of a current thread, and the task execution bodies operate computational tasks corresponding to the operator kernel functions in the task queue;

step 4: creating an event recall queue, wherein the event recall queue is created when all the task execution bodies in the task queue have been processed, and the computational tasks that have been processed by the task execution bodies are added into the event recall queue in sequence; and step 5: creating a thread of the event recall queue, wherein the thread of the event recall queue is used for taking out and returning the tasks in sequence that have been processed in the event recall queue.

Module II: a task execution body internal module, configured to complete the following processes:

Step 1: the current execution body produces tensor data of the current execution body. In particular, the current execution body loads the computational task of the internal operator kernel function of the current execution body, executes kernel function computation, and produces output tensor data of the computational task of the kernel function.

Step 2: the current execution body packs the tensor data produced by the current execution body into a message. In particular, the tensor data produced by the current execution body are stored into an available memory block. An address of the memory block and an identification number of the downstream execution body corresponding to the current execution body are packed into a message. Then, the current execution body prepares to send the message to the downstream execution body corresponding to the current execution body.

Step 3: the current execution body sends the message to the downstream execution body. In particular, when the current execution body completes the computational task of a kernel function of the current execution body and has prepared the message sent to the downstream execution body, it starts to send a message to the downstream execution body that needs to consume the tensor data produced by the current execution body, informing the corresponding downstream execution body of reading the data produced by the current execution body.

Step 4: the current execution body sends the message to the upstream execution body. In particular, the current execution body also needs to return the memory block of the consumed tensor data from the upstream execution body to the upstream execution body, indicating that the current execution body has used the data of the upstream execution body, and that the upstream execution body is permitted recover the memory block of the output tensor data of the upstream execution body.

Step 5: the downstream execution body prepares tensor data. In particular, the downstream execution body prepares the tensor data according to the received message sent by the current execution body. The downstream execution body parses the message to obtain the tensor data produced by the current execution body from the message, and the tensor data are used as an input tensor when the downstream execution body operates an operator kernel function of the downstream execution body.

Step 6: the downstream execution body prepares a tensor memory block required for storing the tensor data produced by the downstream execution body. In particular, the downstream execution body requests a memory block of output tensor data produced when the downstream execution body executes the computational task of the corresponding operator kernel function.

Step 7: the downstream execution body operates the task of an internal operator kernel function and produces output tensor data. In particular, the downstream execution body determines whether the following execution conditions are currently satisfied after receiving the message of the aforesaid current execution body: a) tensor data needing to be read by the downstream execution body are ready; and b) there is an idle memory block used for storing the output tensor data produced when the downstream execution body operates the corresponding operator kernel function. When the execution conditions are satisfied, the downstream execution body starts to call an internal operator kernel function of the downstream execution body, reads the tensor data sent by the above current execution body, executes the computational task of the internal operator kernel function of the downstream execution body, and writes the produced output tensor into the idle tensor memory block.

Module III: a task execution body pipelining and parallelizing module, configured to complete the following processes:

Step 1: an idle memory block is allocated to each execution body. In particular, a physical computational graph composed of operator a→operator b→operator c→ . . . →operator i is constructed. Execution bodies for operating their own kernel functions are created respectively according to the respective operators to constitute an execution computational graph of execution body A→execution body B→execution body C→ . . . →execution body I, wherein the arrow denotes that a downstream operator or execution body consumes the tensor data produced by an upstream operator or execution body. An idle memory block for tensors produced and consumed by each execution body is allocated to each execution body and then different batches of input data are fed. A memory is allocated for tensor data produced when execution body A executes a kernel function of operator a. In particular, the idle memory block corresponding to a zeroth batch of data is memory block a0, the idle memory block corresponding to a first batch of data is memory block a1, the idle memory block corresponding to a second batch of data is memory block a2, . . . , and the idle memory block corresponding to an ith batch of data is memory block ai. A memory is allocated for tensor data produced when execution body B executes a kernel function of operator b. In particular, the idle memory block corresponding to the zeroth batch of data is memory block b0, the idle memory block corresponding to the first batch of data is memory block b1, . . . , and the idle memory block corresponding to the ith batch of data is memory block bi. A memory is allocated for tensor data produced when execution body C executes a kernel function of operator c. In particular, the idle memory block corresponding to the zeroth batch of data is memory block c0, the idle memory block corresponding to the first batch of data is memory block c1, . . . , and the idle memory block corresponding to the ith batch of data is memory block ci. The allocation of memory process continues until a memory block is allocated for tensor data produced when execution body I executes a kernel function of operator i.

Step 2: execution of a task execution body is initiated.

In particular, at time T0, the zeroth batch of data is input; execution body A executes the kernel function of operator a and writes the output tensor data as an operation result into idle memory block a0. Downstream execution body B, execution body C, . . . , and execution body I are all in a waiting state since there are no readable input tensor data.

Step 3: the entire computational graph is operated in parallel.

In particular, execution body A informs execution body B of reading memory block a0 produced by execution body A. Execution body B receives the message, and checks whether there is an idle memory block available among memory block b produced by execution body B. If an idle memory block b0 is found available, execution body B executes the computational task of the kernel function of operator b, reads memory block a0, and writes an output tensor result produced by execution into memory block b0. At time T1, execution body A may also check whether execution body A has a writable idle memory block. If execution body A has the writable idle memory block, at time T1, execution body A also executes the first batch of input data and writes an execution result into idle memory block a1, so that execution body A and execution body B start to operate in parallel. Downstream execution body C, . . . , and execution body I still wait since there are no readable data.

At time T2, after producing memory block b0, execution body B sends a message to downstream consumer, i.e. execution body C, to inform it to read memory block b0 produced. At time T2, execution body B sends a message to the upstream producer, i.e. execution body A, to inform it that execution body B has used memory block a0 of execution body A. At time T2, execution body A sends memory block a1 produced by training the first batch of input data to execution body B for a second time. Execution body B checks to find that it still has idle memory block b1, starts to read memory block a1, and writes into idle memory block b1. Execution body C receives a message of reading memory block b0 and finds that it has an idle memory block c0, starts to read memory block b0 and then writes into memory block c0. Execution body A receives the message that execution body B has used and returned memory block a0, checks that all consumers have used memory block a0, and then recovers memory block a0 and labels it as an idle memory block. At time T2, execution body A may also continue execution and write into memory block a2.

At time T2, execution bodies A, B, and C all operate. In a deep learning training task, at time T2, memory block b0 and memory block c0 store the zeroth batch of data for training, memory block a1 and memory block b1 store the first batch of data for training, and memory block a2 stores the second batch of data for training. By means of the design of a plurality of idle memory blocks, the execution bodies realize pipelining and parallelizing operation. FIG. 5 illustrates a process of pipelining and parallelizing execution of execution bodies.

Figure 6:
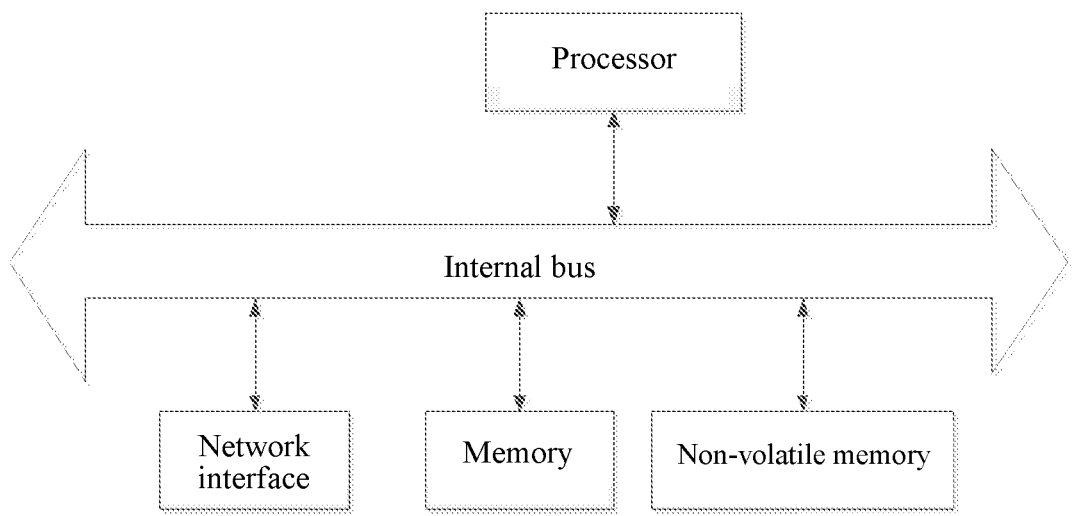
FIG. 6 is a schematic diagram of an apparatus for execution of a computational graph in a neural network model according to an embodiment of the present disclosure.

Referring to FIG. 6, an embodiment of the present disclosure further provides an apparatus for execution of a computational graph in a neural network model, which includes a memory storing executable code and one or more processors. The one or more processors implement the method for generation of intermediate representation of the computation in a neural network model in the aforesaid embodiment when executing the executable codes.

The embodiment of the apparatus for execution of the computational graph in the neural network model of the present disclosure can be applied to any device with data processing capability, which can be a device or apparatus such as a computer. An embodiment of the apparatus may be implemented by software, or may be implemented by hardware or a combination of software and hardware. As an example of implementation by software, the apparatus in a logical sense is formed by reading a corresponding computer program instruction stored in a non-volatile memory into a memory through a processor of any device with data processing capability where the apparatus is located. From the perspective of hardware, FIG. 6 shows a hardware structure diagram of any device with data processing capability where an apparatus for execution of a computational graph in a neural network model of the present disclosure is located. In addition to a processor, a memory, a network interface, and a non-volatile memory as shown in FIG. 6, the device where the apparatus is located may also include other hardware according to the actual functions of the device, which will not be elaborated here. For the implementation process of the functions and effects of blocks in the above apparatus, reference may be made to the implementation process of the corresponding steps in the above method, which will not be elaborated here.

Since an apparatus embodiment corresponds to a method embodiment, for related parts, reference may be made to the corresponding descriptions in the method embodiment. The embodiments of apparatus described above are merely illustrative. The blocks described as separate components may be or may not be physically separated, and the components displayed as blocks may be or may not be physical blocks, that is, may be located in one place, or may be distributed to multiple network blocks. Some or all of the modules may be selected according to actual needs to realize the objectives of the solutions of the present disclosure. Those of ordinary skill in the art can understand and implement the present disclosure without making any inventive effort.

An embodiment of the present disclosure further provides a computer-readable storage medium storing a program, wherein the method for execution of the computational graph in the neural network model in the above embodiment is implemented when the program is executed by a processor.

The computer-readable storage medium may be an internal memory block of any device with data processing capability described in any of the foregoing embodiments, such as a hard disk or a memory. The computer-readable storage medium may also be an external storage device of any device with data processing capability, such as a plug-in hard disk, a smart media card (SMC), an SD card and a flash card equipped on the device. Further, the computer-readable storage medium may include not only an internal memory block of any device with data processing capability and also an external storage device. The computer-readable storage medium is used for storing the computer program and other programs and data required by any device with data processing capability, and may also be used for temporarily storing data that have been output or will be output.

Through the above description, the whole process of implementing the apparatus for execution of the computational graph in the neural network model is completed. The apparatus is tested below.

A classic and prevalent deep learning model ResNet-50 v1.5 is selected for the test, wherein ResNet-50 is the most mainstream deep learning model in the field of computer vision. There are 4 machines in the test environment, and each machine is equipped with 8 graphics cards having V100 GPUs. For a neural network model of a deep learning framework, a throughput rate thereof in a distributed environment is tested. The throughput rate represents the processing speed of the deep learning framework. The higher the throughput rate, the shorter the time required to train a deep learning model, and the higher the performance of the deep learning framework. The throughput rate specifically refers to the number of samples processed by the deep learning framework per second during the training process. For an image classification task, the throughput rate denotes how many images are processed per second.

The test results are as follows:

TABLE 1

Test of an apparatus for execution of a computational graph in a neural network model.

| Number of nodes | Number of devices | PyTorch | TensorFlow2.x | The intermediate representation generation apparatus |
|---|---|---|---|---|
| 1 | 1 | 348.62 | 321.80 | 390.64 |
| 1 | 8 | 2632.93 | 2458.74 | 3130.34 |
| 2 | 16 | 5115.40 | 4849.68 | 6260.10 |
| 4 | 32 | 10021.29 | 9418.44 | 12411.90 |

Block: pictures/second

The test results show that in the Resnet50 model, the performance of the apparatus for execution of the computational graph in the neural network model is higher than other existing mainstream deep learning frameworks.

The above embodiments are merely preferred embodiments of the present disclosure and not intended to limit the present disclosure. Any modifications, equivalent substitutions, improvements, or the like made within the spirit and principles of the present disclosure shall fall within the scope of protection of the present disclosure.

What is claimed is:

1. A method for execution of a computational graph in a neural network model, characterized in that task execution bodies on a native machine are created according to a physical computational graph compiled and generated by a deep learning framework, and a plurality of idle memory blocks are allocated to each task execution body, so that the entire computational graph simultaneously participates in a deep learning training task in a pipelining and parallelizing manner, the method comprising the following steps:

S1: creating the task execution bodies, wherein operator kernel functions for operating different operators are regarded as different computational tasks, and the task execution bodies are constructed respectively corresponding to respective kernel functions to execute the operator kernel functions; wherein the task execution bodies include a current execution body, a downstream execution body in communication with the current execution body, and an upstream execution body in communication with the current execution body;

S2: producing, by the current execution body, tensor data of the current execution body;

S3: packing, by the current execution body, the tensor data produced by the current execution body into a message;

S4: sending, by the current execution body, the message to the downstream execution body;

S5: sending, by the current execution body, the message to the upstream execution body;

S6: preparing, by the downstream execution body, the tensor data, wherein the downstream execution body prepares the tensor data according to the message sent from the current execution body;

S7: preparing, by the downstream execution body, an idle tensor memory block for storing the tensor data produced by the downstream execution body;

S8: performing, by the downstream execution body, a task of an internal operator kernel function of the downstream execution body, and producing output tensor data;

S9: constructing a data parallelizing mode between the task execution bodies, including the following specific sub-steps:

S91: allocating an idle memory block to each task execution body, wherein a specific process of step S91 is as follows:

S911: constructing a physical computational graph composed of a plurality of operators having production and consumption relationships, wherein the plurality of operators are labeled as operator a, operator b, operator c, . . . , and operator i; thus creating respective execution bodies for executing their own kernel functions respectively according to the operators, and constituting an execution computational graph composed of corresponding execution body A, execution body B, execution body C, . . . , and execution body I, which have production and consumption relationships;

S912: feeding different batches of input data and allocating a memory for tensor data produced when execution body A executes a kernel function of operator a, wherein the idle memory block corresponding to a zeroth batch of data is memory block a0, the idle memory block corresponding to a first batch of data is memory block a1, the idle memory block corresponding to a second batch of data is memory block a2, . . . , and the idle memory block corresponding to an ith batch of data is memory block ai;

allocating a memory for tensor data produced when execution body B executes a kernel function of operator b, wherein the idle memory block corresponding to the zeroth batch of data is memory block b0, the idle memory block corresponding to the first batch of data is memory block b1, the idle memory block corresponding to the second batch of data is memory block b2, . . . , and the idle memory block corresponding to the ith batch of data is memory block bi;

allocating a memory for tensor data produced when execution body C executes a kernel function of operator c, wherein the idle memory block corresponding to the zeroth batch of data is memory block c0, the idle memory block corresponding to the first batch of data is memory block c1, the idle memory block corresponding to the second batch of data is memory block c2, . . . , and the idle memory block corresponding to the ith batch of data is memory block ci;

repeating procedures of steps S911 and S912 until a memory is allocated for tensor data produced when execution body I executes a kernel function of operator i;

S92: initiating execution of a task execution body, wherein: at time T0, the zeroth batch of data is input, execution body A executes the kernel function of operator a and writes an output tensor of an execution result into idle memory block a0; downstream execution body B, downstream execution body C, . . . , and downstream execution body I are in a waiting state since there are no readable input tensor data; and S93: operating the entire computational graph in parallel, wherein:

at time T1, execution body A informs execution body B of reading memory block a0 produced by execution body A; execution body B receives a message of reading memory block a0 produced by execution body A and checks whether there is an idle memory block available in memory region b produced by execution body B; if idle memory block b0 is available, execution body B executes a computational task of the kernel function of operator b, reads memory block a0 and writes the output tensor produced by the execution into memory block b0; at time T1, execution body A also checks whether execution body A has a writable idle memory block; if execution body A has the writable idle memory block, execution body A also inputs the first batch of data at time T1 and writes the execution result into idle memory block a1, so that execution body A and execution body B start to operate in parallel, and downstream execution body C, . . . and downstream execution body I still wait since there are no readable data;

at time T2, execution body B, after producing memory block b0, sends a message to a downstream consumer, i.e. execution body C, to inform execution body C of reading memory block b0 produced by execution body B; at time T2, a message is sent to an upstream producer, i.e. execution body A, to inform execution body A of a fact that execution body B has used memory block a0 of execution body A; at time T2, execution body A sends memory block a1 produced for training the first batch of input data to execution body B for a second time; execution body B checks to find that it has idle memory block b1, and thus starts to read memory block a1 and write into idle memory block b1;

execution body C receives a message of reading memory block b0, and when finding idle memory block c0 available therein, starts execution of a computational task of the kernel function of operator c, reads memory block b0 and writes into memory block c0; execution body A receives a message of memory block a0 having been used and returned by execution body B, checks to find that all of consumers of execution body A have used memory block a0, then recovers memory block a0 and labels it as an idle block; at time T2, execution body A continues execution and writes into memory block a2;

at time T2, execution bodies A, B, and C all operate, for the deep learning training task, at time T2, memory block b0 and memory block c0 store the zeroth batch of data for training; memory block a1 and memory block b1 store the first batch of data for training; memory block a2 stores the second batch of data for training; and all the execution bodies are operated in a pipeline parallel manner by step S93.

2. The method for execution of the computational graph in the neural network model according to claim 1, wherein a specific process of step S1 is as follows:

S11: creating a task queue of the operator kernel functions, wherein computational tasks of a current operator kernel function are added into a task queue of the current operator kernel function in sequence, and computational graphs are added into the task queue of the current operator kernel function in sequence through the computational tasks of the current operator kernel function according to a topological order until the entire computational graph is added into the task queue;

S12: creating threads of the task execution bodies, wherein the threads of the task execution bodies acquire current to-be-processed tasks in sequence from the task queue;

S13: creating the task execution bodies of the operator kernel functions, wherein the task execution bodies for calculating operator kernel functions are created according to the current to-be-processed tasks and context information of a current thread, and the computational tasks corresponding to the operator kernel functions in the task queue are performed by the task execution bodies;

S14: creating an event recall queue, wherein the event recall queue is created when all the task execution bodies in the task queue are processed, and the computational tasks that are processed by the task execution bodies are added into the event recall queue in sequence; and S15: creating a thread of the event recall queue, wherein the thread of the event recall queue is used for taking out and returning the tasks that have been processed in the event recall queue.

3. The method for execution of the computational graph in the neural network model according to claim 1, wherein a specific process of step S2 is as follows:

loading the computational task of an internal operator kernel function of the current execution body, by the current execution body, and executing a kernel function computation, and producing output tensor data of the computational task of the kernel function.

4. The method for execution of the computational graph in the neural network model according to claim 1, wherein a specific process of step S3 is as follows:

storing the tensor data produced by the current execution body into an idle memory block; packing an address of the idle memory block and an identity identification number of the downstream execution body corresponding to the current execution body into a message; and sending, by the current execution body, the message to the downstream execution body corresponding to the current execution body.

5. The method for execution of the computational graph in the neural network model according to claim 1, wherein a specific process of step S4 is as follows:

by the current execution body, starting to send the message to the downstream execution body that needs to consume the tensor data produced by the current execution body and informing the corresponding downstream execution body of reading the data produced, when the current execution body completes the computational task of a kernel function of the current execution body and the message sent to the downstream execution body is prepared.

6. The method for execution of the computational graph in the neural network model according to claim 1, wherein a specific process of step S5 is as follows:

returning, by the current execution body, the memory block of the consumed tensor data from the upstream execution body to the upstream execution body, the returning indicating that the current execution body has used the data of the upstream execution body and that the upstream execution body is permitted to recover the memory block of the output tensor data of the upstream execution body.

7. The method for execution of the computational graph in the neural network model according to claim 1, wherein a specific process of step S6 is as follows:

parsing, by the downstream execution body, the message to obtain the tensor data produced by the current execution body, wherein the tensor data are used as an input tensor when the downstream execution body operates an operator kernel function of the downstream execution body.

8. The method for execution of the computational graph in the neural network model according to claim 1, wherein a specific process of step S7 is as follows:

requesting, by the downstream execution body, a memory block of output tensor data produced when the computational task of a corresponding operator kernel function is executed.

9. The method for execution of the computational graph in the neural network model according to claim 1, wherein a specific process of step S8 is as follows:

S81: determining, by the downstream execution body, whether the following execution conditions are satisfied after receiving the message of the current execution body: a) tensor data needing to be read by the downstream execution body are ready; and b) there is an idle memory block available for storing the output tensor data produced when the downstream execution body operates the corresponding operator kernel function; and S82: after the execution conditions are satisfied, starting, by the downstream execution body, to call an internal operator kernel function of the downstream execution body, reading the tensor data sent from the current execution body, executing the computational task of the internal operator kernel function, and writing the produced output tensor into an available tensor memory block.

10. An apparatus for execution of a computational graph in a neural network model, comprising a memory and one or more processors, wherein the memory stores executable codes; the one or more processors implement the method for execution of the computational graph in the neural network model according to claim 1 when executing the executable codes.

11. An apparatus for execution of a computational graph in a neural network model, comprising the following modules:
a task execution body construction module, configured for creating a task queue of operator kernel functions, threads of task execution bodies, task execution bodies of kernel functions, an event recall queue, and a thread of the event recall queue;
a task execution body internal module, configured for: by a current execution body, producing tensor data of the current execution body, packing the tensor data into a message, and sending the message to an upstream execution body and a downstream execution body; by the downstream execution body, preparing tensor data, preparing an available tensor memory block required for storing data produced by the downstream execution body, and executing a task of an internal operator kernel function of the downstream execution body and producing output tensor data; and
a task execution body pipelining and parallelizing module, configured for allocating idle memory blocks to the respective task execution bodies, initiating execution of tasks, making execution bodies perform the entire computational graph in parallel, wherein a specific process executed by the task execution body pipelining and parallelizing module is as follows:
step 1: allocating idle memory blocks to execution bodies, wherein a physical computational graph composed of a plurality of operators having production and consumption relationships is constructed, the operators is labeled as operator a, operator b, operator c, . . . , and operator i; execution bodies for executing their own kernel functions are created according to respective operators to constitute an execution computational graph composed of execution body A, execution body B, execution body C, . . . , and execution body I having production and consumption relationships; and an idle memory block for tensors produced and consumed by each execution body is allocated to the corresponding execution body;
feeding different batches of input data, wherein a memory is allocated for tensor data produced when execution body A executes a kernel function of operator a, wherein the idle memory block corresponding to a zeroth batch of data is memory block a0, the idle memory block corresponding to a first batch of data is memory block a1, the idle memory block corresponding to a second batch of data is memory block a2, . . . , and the idle memory block corresponding to an ith batch of data is memory ai;
allocating a memory for tensor data produced when execution body B executes a kernel function of operator b, wherein the idle memory block corresponding to the zeroth batch of data is memory block b0, the idle memory block corresponding to the first batch of data is memory block b1, the idle memory block corresponding to the second batch of data is memory block b2, . . . , and the idle memory block corresponding to the ith batch of data is memory block bi;
allocating a memory for tensor data produced when execution body C executes a kernel function of operator c, wherein the idle memory block corresponding to the zeroth batch of data is memory block c0, the idle memory block corresponding to the first batch of data is memory block c1, the idle memory block corresponding to the second batch of data is memory block c2, . . . , and the idle memory block corresponding to the ith batch of data is memory block ci;
repeating the memory allocation process until a memory block is allocated for tensor data produced when execution body I executes a kernel function of operator i;
step 2: initiating execution of an execution body, wherein at time T0, the zeroth batch of data is input, execution body A executes the kernel function of operator a and writes the output tensor data as an execution result into idle memory block a0, and downstream execution body B, execution body C, . . . , and execution body I are in a waiting state since there are no readable input tensor data;
step 3: performing the entire computational graph in parallel, wherein at time T1, execution body A informs execution body B of reading memory block a0 produced by execution body A; execution body B receives a message of reading memory block a0 produced by execution body A, and checks whether there is an idle memory block available in memory region b produced by execution body B; if it finds that there is idle memory block b0 available, execution body B executes the computational task of the kernel function of operator b and reads memory block a0; execution body B writes an output tensor result generated by execution into memory block b0; at time T1, execution body A also checks whether execution body A has a writable idle memory block; if execution body A has the writable idle memory block, at time T1, execution body A also executes the first batch of input data and writes an execution result into idle memory block a1, so that execution body A and execution body B start to operate in parallel; and downstream execution body C, . . . , and execution body I are still in the waiting state since there are no readable data;
at time T2, execution body B sends a message to a downstream consumer, i.e. execution body C, to inform execution body C of reading memory block b0 after execution body B produces memory block b0; at time T2, execution body B sends a message to an upstream producer, i.e. execution body A, to inform execution body A of a fact that execution body B has used memory block a0 of execution body A; at time T2, execution body A sends memory block a1 produced for training the first batch of input data to execution body B for a second time; execution body B checks to find that it still has idle memory block b1, thus starts to read memory block a1 and write into idle memory block b1; execution body C receives memory block b0 and finds that it has an idle memory block c0 available, then starts to read memory block b0 and write into memory block c0; execution body A receives a message of memory block a0 having been used and returned by execution body B and checks to find that all of consumers of execution body A have used memory block a0, then execution body A recovers memory block a0 and labels memory block a0 as an idle block; execution body A also continues to execute and write into memory block a2;

at time T2, execution bodies A, B, and C all operate, wherein for a deep learning training task, at time T2, memory block b0 and memory block c0 store the zeroth batch of data for training; memory block a1 and memory block b1 store the first batch of data for training; memory block a2 stores the second batch of data for training; and all the execution bodies are operated in a pipeline parallel manner by step 3.

12. The apparatus for execution of the computational graph in the neural network model according to claim 11, wherein a specific process executed by the task execution body construction module is as follows:

step 1: creating a task queue of the operator kernel functions, wherein computational tasks of a current operator kernel function are added into a task queue of the current operator kernel function in sequence, and computational graphs are added into the task queue of the current operator kernel function in sequence through the computational tasks of the current operator kernel function according to a topological order until the entire computational graph is added into the task queue;

step 2: creating threads of the task execution bodies, wherein the threads of the task execution bodies acquire current to-be-processed tasks in sequence from the task queue;

step 3: creating the task execution bodies of the operator kernel functions, wherein task execution bodies for calculating operator kernel functions are created according to the current to-be-processed tasks and context information of a current thread, and the computational tasks corresponding to the operator kernel functions in the task queue are performed by the task execution bodies;

step 4: creating an event recall queue, wherein the event recall queue is created when all the task execution bodies in the task queue are processed, and the computational tasks that are processed by the task execution bodies are added into the event recall queue in sequence; and step 5: creating a thread of the event recall queue, wherein the thread of the event recall queue is used for taking out and returning the tasks that have been processed in the event recall queue.

13. The apparatus for execution of the computational graph in the neural network model according to claim 11, wherein a specific process executed by the task execution body internal module is as follows:

step 1: producing, by the current execution body, tensor data of the current execution body, wherein the current execution body loads a computational task of an internal operator kernel function of the current execution body, executes kernel function computation, and produces output tensor data of the computational task of the kernel function;

step 2: packing, by the current execution body, the tensor data produced by the current execution body into a message, wherein the tensor data produced by the current execution body are stored into an available memory block, an address of the available memory block and an identification number of the downstream execution body corresponding to the current execution body are packed into a message; and then the current execution body prepares to send the message to the downstream execution body corresponding to the current execution body;

step 3: sending, by the current execution body, the message to the downstream execution body, wherein when the current execution body completes the computational task of an kernel function of the current execution body and has prepared the message sent to the downstream execution body, the current execution body starts to send the message to the downstream execution body that needs to consume the tensor data produced by the current execution body, informing the corresponding downstream execution body of reading the data produced by the current execution body;

step 4: sending, by the current execution body, the message to the upstream execution body, wherein the current execution body also needs to return the memory block of the consumed tensor data from the upstream execution body to the upstream execution body, indicating that the current execution body has used the data of the upstream execution body, and that the upstream execution body is permitted to recover the memory block of the output tensor data of the upstream execution body;

step 5: preparing tensor data by the downstream execution body, wherein the downstream execution body prepares tensor data according to the received message sent by the current execution body, the downstream execution body parses the message to obtain the tensor data produced by the current execution body from the message, and the tensor data are used as an input tensor when the downstream execution body operates an operator kernel function of the downstream execution body;

step 6: preparing, by the downstream execution body, a tensor memory block required for storing the tensor data produced by the downstream execution body, wherein the downstream execution body requests a memory block of output tensor data produced when the downstream execution body executes the computational task of a corresponding operator kernel function; and step 7: operating, by the downstream execution body, the task of an internal operator kernel function of the downstream execution body, and producing output tensor data, wherein the downstream execution body determines whether the following execution conditions are currently satisfied after receiving the message of the current execution body: a) tensor data needing to be read by the downstream execution body are ready; and b) there is an idle memory block used for storing the output tensor data produced when the downstream execution body operates the operator kernel function; and wherein when the execution conditions are satisfied, the downstream execution body starts to call an internal operator kernel function of the downstream execution body, reads the tensor data sent by the current execution body, executes the computational task of the internal operator kernel function of the downstream execution body, and writes the produced output tensor data into an idle tensor memory block.

\* \* \* \* \*